(12) United States Patent
Sterling (10) Patent No.: US 9,623,787 B2
(45) Date of Patent: Apr. 18, 2017

(54) VEHICLE TIE-DOWN ASSEMBLY

(71) Applicant: Nissan North America, Inc., Franklin, TN (US)

(72) Inventor: Shawn Sterling, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 73 days.

(21) Appl. No.: 14/672,599

(22) Filed: Mar. 30, 2015

(65) Prior Publication Data

US 2016/0288693 A1    Oct. 6, 2016

(51) Int. Cl.
*B60P 7/08*    (2006.01)

(52) U.S. Cl.
CPC ........... *B60P 7/0807* (2013.01); *B60P 7/0815* (2013.01)

(58) Field of Classification Search
CPC .... B60P 7/0815; B60P 7/0807; B61D 45/001; B61D 45/00; F16B 37/045; F16B 45/00
USPC .......... 410/104, 106, 105, 12; 411/104, 176, 411/551, 552, 553, 84, 959
See application file for complete search history.

(56) References Cited

U.S. PATENT DOCUMENTS

| 2,688,289 | A | | 9/1954 | Sterling | |
|---|---|---|---|---|---|
| 3,053,355 | A | | 9/1962 | Attwood | |
| 4,850,063 | A | * | 7/1989 | Abbate | E03D 11/16 285/60 |
| 5,044,856 | A | * | 9/1991 | Jerabek | F16B 21/02 411/349 |
| 5,154,385 | A | | 10/1992 | Lindberg et al. | |
| 5,199,836 | A | | 4/1993 | Gogarty | |
| 5,632,586 | A | * | 5/1997 | Nyholm | B65D 90/0013 403/348 |
| 6,827,531 | B2 | | 12/2004 | Womack et al. | |
| 7,040,849 | B2 | * | 5/2006 | Cunningham | B60P 7/0815 410/104 |
| 7,175,377 | B2 | | 2/2007 | Womack et al. | |
| 7,401,995 | B2 | | 7/2008 | Senakiewich, II | |
| 7,874,774 | B2 | | 1/2011 | Peterson | |
| 7,980,798 | B1 | * | 7/2011 | Kuehn | B60P 7/0815 410/104 |
| 2003/0156919 | A1 | * | 8/2003 | Schwarz | F16B 37/045 411/349 |
| 2008/0279649 | A1 | | 11/2008 | Womack et al. | |
| 2009/0080995 | A1 | | 3/2009 | Peterson | |
| 2014/0160776 | A1 | | 6/2014 | Sura et al. | |

* cited by examiner

*Primary Examiner* — Glenn Dayoan
*Assistant Examiner* — Sunsurraye Westbrook
(74) *Attorney, Agent, or Firm* — Global IP Counselors, LLP (57) ABSTRACT

A tie-down assembly includes a clamping member configured to engage an accessory track of a vehicle. The clamping member is movable between engaged and disengaged positions. A cleat receives the clamping member and has a first side that engages the accessory track. A shaft of the clamping member passes through the cleat. A tightening member receives a free end of the shaft of the clamping member. The tightening member engages the shaft on a second side of the cleat opposite the first side. An indicator is fixed to the clamping member and is movable with the clamping member between a locked position in which the clamping member is in the engaged position and an unlocked position in which the clamping member is in the disengaged position. The indicator indicates the locked and unlocked positions when viewed from the second side of the cleat.

20 Claims, 10 Drawing Sheets

VEHICLE TIE-DOWN ASSEMBLY

BACKGROUND

Field of the Invention

The present invention generally relates to a tie-down assembly for a vehicle. More specifically, the present invention relates to a vehicle tie-down assembly including an indicator moving with a clamping member to indicate engaged and disengaged positions of the clamping member.

Background Information

An accessory track system is commonly used in a vehicle to easily install and remove accessories. One conventional accessory track system includes a track that is engaged by a tie-down assembly. A clamping member of the tie-down assembly is movable between a position in which the tie-down assembly is secured to the track and a position in which the tie-down assembly is removable from the track. However, a user cannot easily determine the position of the clamping member. The user must manually determine whether the clamping member is in the position secured to the accessory track or in the position enabling the tie-down assembly to be removed from the accessory track.

SUMMARY

In view of the state of the known technology, one aspect of the present disclosure is a tie-down assembly including a clamping member configured to engage an accessory track of a vehicle. The clamping member is movable between an engaged position securing the tie-down assembly to the accessory track and a disengaged position such that the tie-down assembly is removable from the accessory track. A cleat movably receives the clamping member and has a first side configured to engage the accessory track. A shaft of the clamping member passes through the cleat. A tightening member movably receives a free end of the shaft of the clamping member. The tightening member engages the shaft on a second side of the cleat opposite the first side of the cleat. An indicator is fixed to the clamping member and is movable with the clamping member between a locked position in which the clamping member is in the engaged position and an unlocked position in which the clamping member is in the disengaged position. The indicator indicates the locked and unlocked positions when viewed from the second side of the cleat.

Another aspect of the present invention is to provide a vehicle track system including a body structure and an accessory track formed therein. A tie-down assembly is engageable with the accessory track. The tie-down assembly includes a clamping member configured to engage the accessory track and including a shaft. The clamping member is movable between an engaged position securing the tie-down assembly to the accessory track and a disengaged position such that the tie-down assembly is removable from the accessory track. A cleat movably receives the clamping member and has a first side configured to engage the accessory track. The shaft of the clamping member passes through the cleat. A tightening member movably receives a free end of the shaft of the clamping member. The tightening member engages the shaft on a second side of the cleat opposite the first side of the cleat. An indicator is fixed to the clamping member. The indicator is movable with the clamping member such that the indicator extends beyond an outer peripheral edge of the cleat when the clamping member is in the disengaged position.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
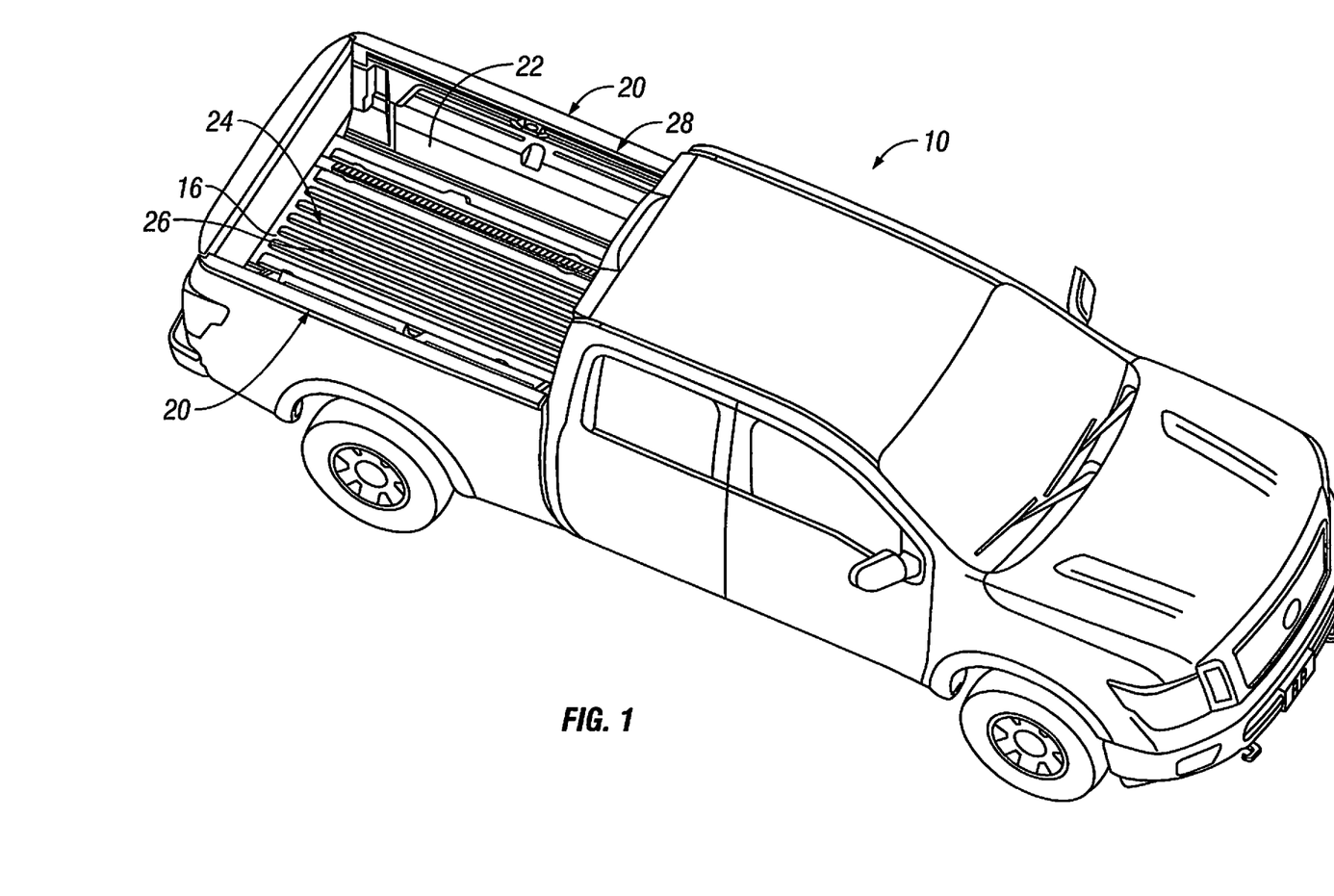
FIG. 1 is a perspective view of a vehicle including a tie-down assembly in accordance with an exemplary embodiment of the present invention.
Figure 2:
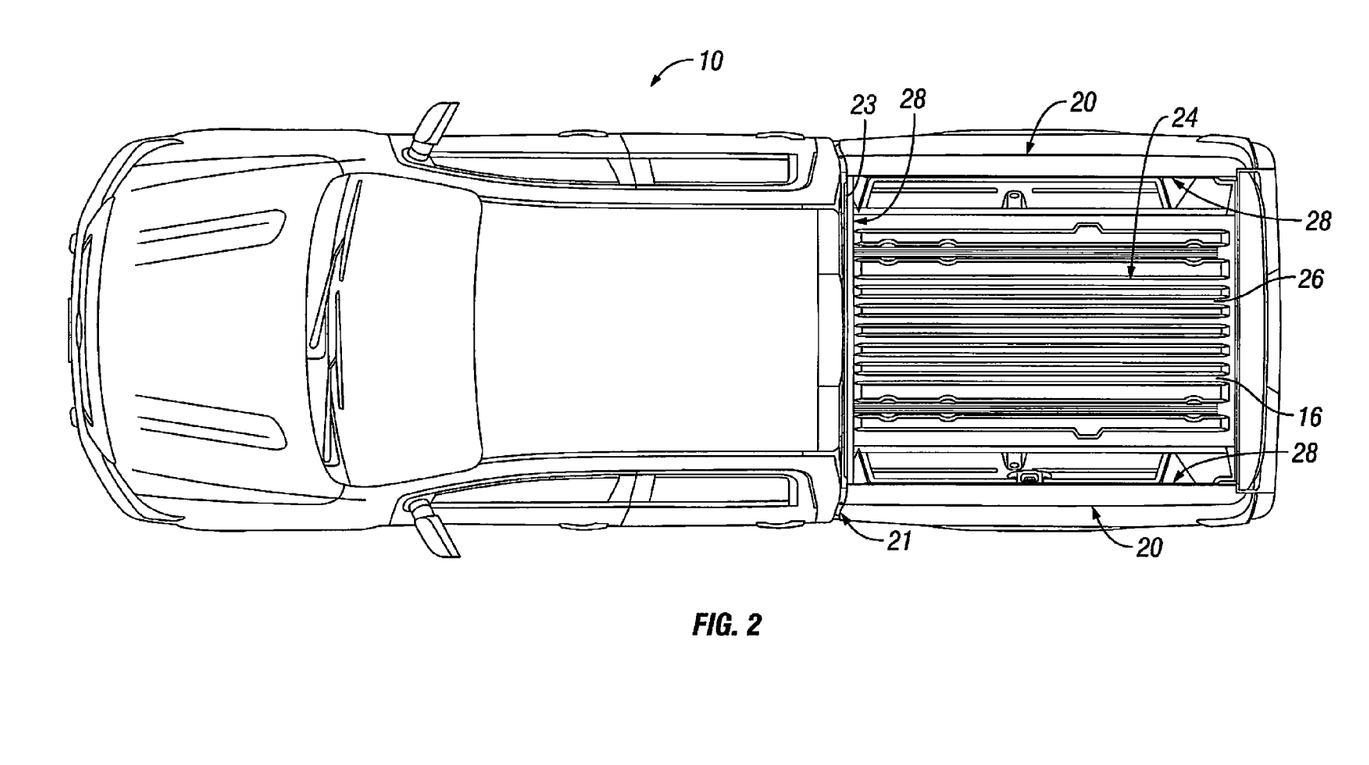
FIG. 2 is a plan view of the vehicle of FIG. 1.

Referring initially to FIGS. 1 and 2, a vehicle 10 that includes a tie-down assembly 12 is illustrated in accordance with an exemplary embodiment of the present invention.

As shown in FIGS. 1 and 2, the vehicle 10 includes a side wall structure 20 having an inboard facing surface 22 facing a cargo area 24 and a front wall structure 21 having a rearward facing surface 23 facing the cargo area 24. The cargo area 24 includes a floor 26, with the inboard facing surface 22 extending upward from the floor 26 and being approximately perpendicular to the floor 26. In the exemplary embodiment, the vehicle 10 is a pickup truck. However, it should be understood from the drawings and the description herein that the vehicle 10 can be any vehicle that includes a cargo area, such as a semi-trailer truck, a cargo van, or other similar vehicle. Further, in the exemplary embodiment, the cargo area 24 has an open upper end. The cargo area 24 can alternatively be an enclosed space with a roof structure and wall structures that extend from the floor 26 to the roof structure.

In the exemplary embodiment, the vehicle 10 includes a plurality of accessory tracks 28. Each of the accessory tracks 28 is substantially identical. Therefore, the description of one accessory attachment track 28 applies to all.

Figure 3:
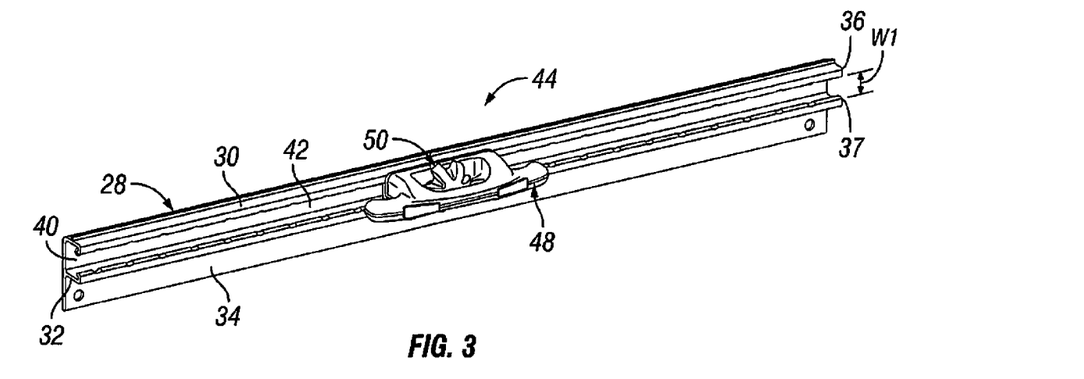
FIG. 3 is a perspective view of a vehicle accessory track engaged by the tie-down assembly.
Figure 7:
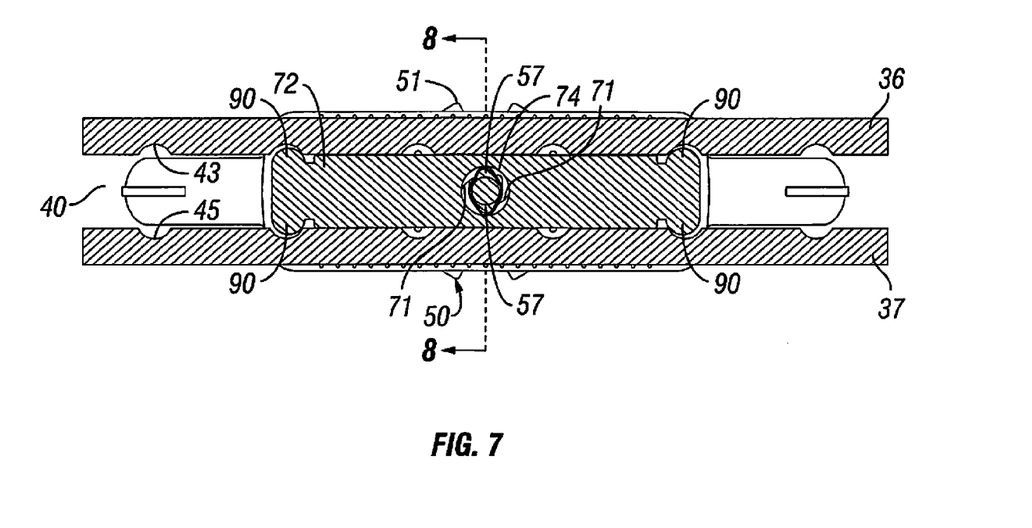
FIG. 7 is an outboard side elevation view in cross-section of the tie-down assembly received by the vehicle accessory track of FIG. 3.
Figure 8:
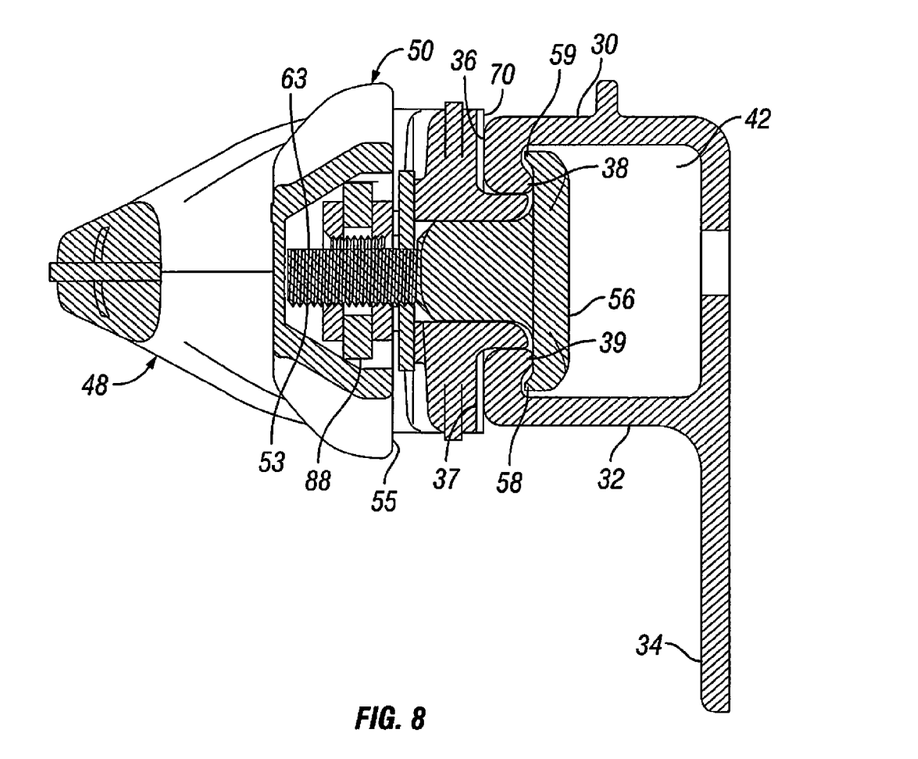
FIG. 8 is a rear elevation view in cross-section of the tie-down assembly received by the vehicle accessory track of FIG. 3.

The accessory track 28 is fastened or otherwise rigidly attached to the inboard facing surface 22. The accessory track 28 is an elongated member that includes an upper wall 30, a lower wall 32 and a flange portion 34, as shown in FIGS. 3 and 8. The upper and lower walls 30 and 32 extend outwardly from the flange portion 34. Preferably, the upper and lower walls 30 and 32 are substantially parallel. An upper outer wall 36 extends downwardly from an end of the upper wall 30. A lower outer wall 37 extends upwardly from an end of the lower wall 32 toward the upper outer wall 36. The upper outer wall 36 and the lower outer wall 37 are preferably substantially parallel. A plurality of upper recesses 43 is formed in the upper outer wall 36 and a plurality of lower recesses 45 is formed in the lower outer wall 37, as shown in FIG. 7. An upper projection 38 extends inwardly from an end of the upper outer wall 36 toward the flange portion 34. A lower projection 39 extends inwardly from an end of the lower outer wall 37 toward the flange portion 34. An elongated slot 40 is defined between the upper outer wall 36 and the upper lower wall 37. The slot 40 has a width W1, as shown in FIG. 3. The upper and lower walls 30 and 32, the upper and lower outer walls 36 and 37, and the flange portion 34 define a substantially hollow interior 42 of the accessory track 28. The upper and lower walls 30 and 32, the upper and lower outer walls 36 and 37, the upper and lower projections 38 and 39, the slot 40 and the flange portion 34 preferably extend the entire length of the accessory track 28.

The flange portion 34 of the accessory track 28 is fixed to the wall structure 20 at a location spaced apart from and above the floor 26. In the exemplary embodiment, the accessory track 28 is fastened to the inboard facing surface 22 proximate an upper edge of the wall structure 20. As shown in FIG. 2, several of the accessory tracks 28 can be installed to the cargo area 24 of the vehicle 10. For example, in the exemplary embodiment, one of the attachment tracks 28 is installed to a front wall structure 21 of the cargo area 24 and separate ones of the attachment tracks 28 are installed to each of the side wall structures 20 on either side of the cargo area 24.

The tie-down assembly 44 includes a clamping member 46 configured to engage the accessory track 28, a cleat 48 movably receiving the clamping member 46 and configured to engage the accessory track 28, a tightening member 50 movably receiving the clamping member 46, and an indicator 52 fixed to the clamping member 46 and movable with the clamping member 46 to indicate a position thereof.

The clamping member 46 includes a shaft portion 54 and a clamping portion 56. The clamping portion 56 is generally an elongated bar that includes a pair of outwardly extending projections 58 and 59 that are spaced apart from one another by a distance that is greater than the distance between the inwardly extending projections 38 and 39 of the accessory 28. The shaft portion 54 extends outwardly from the clamping portion 56 and has a non-threaded portion 60 and a threaded portion 62. Lobes 57 extend radially outwardly from an outer surface of the non-threaded portion 62 of the shaft portion 54. The lobes 57 are diametrically opposed and extend generally along the entire length of the non-threaded portion 62. The shaft portion 54 is preferably fixed to the clamping portion 56.

Figure 6:
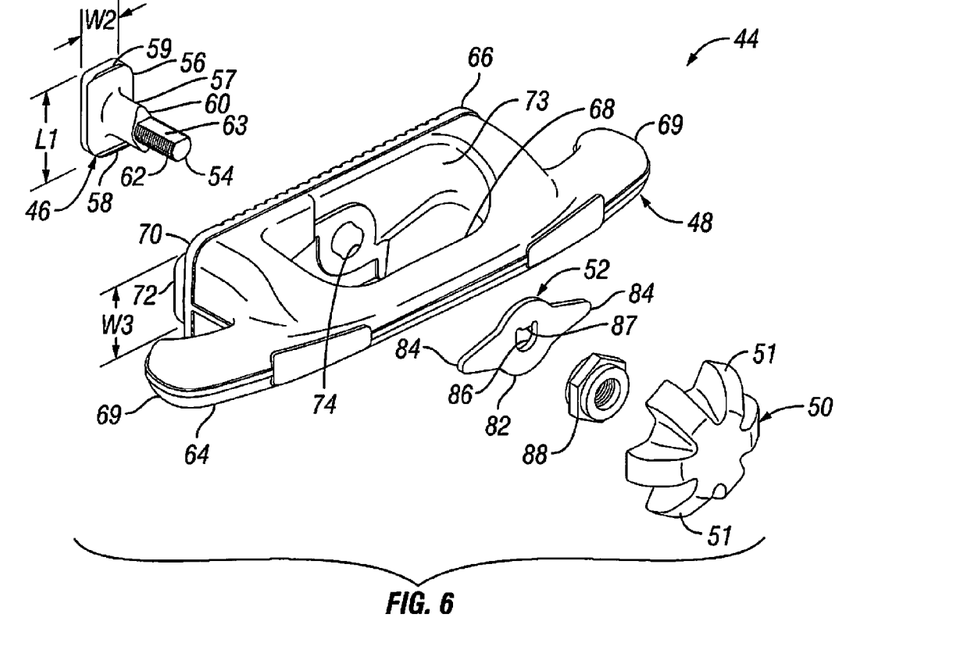
FIG. 6 is an exploded view of the tie-down assembly.

The clamping portion 56 has a width W2 and a length L1, as shown in FIG. 6. The width W2 of the clamping portion 56 is preferably approximately equal to or slightly less that the width W1 of the slot 40 of the accessory track 28. The length L1 of the clamping portion 56 is greater than the width W1 of the slot 40 of the accessory track 28.

The cleat 48 includes an outer part 64 and a base part 66. The outer part 64 includes an opening 68 and a pair of hook-like shapes that define each of the tie-down ends 69. The opening 68 is configured to receive a rope, hook or chain (not shown) that is used to secure cargo within the cargo area 16 in a conventional manner. Each of the pair of tie-down ends 69 is configured to receive a loop of rope or hook to similarly secure cargo within the cargo area 16 of the vehicle 10.

Figure 10:
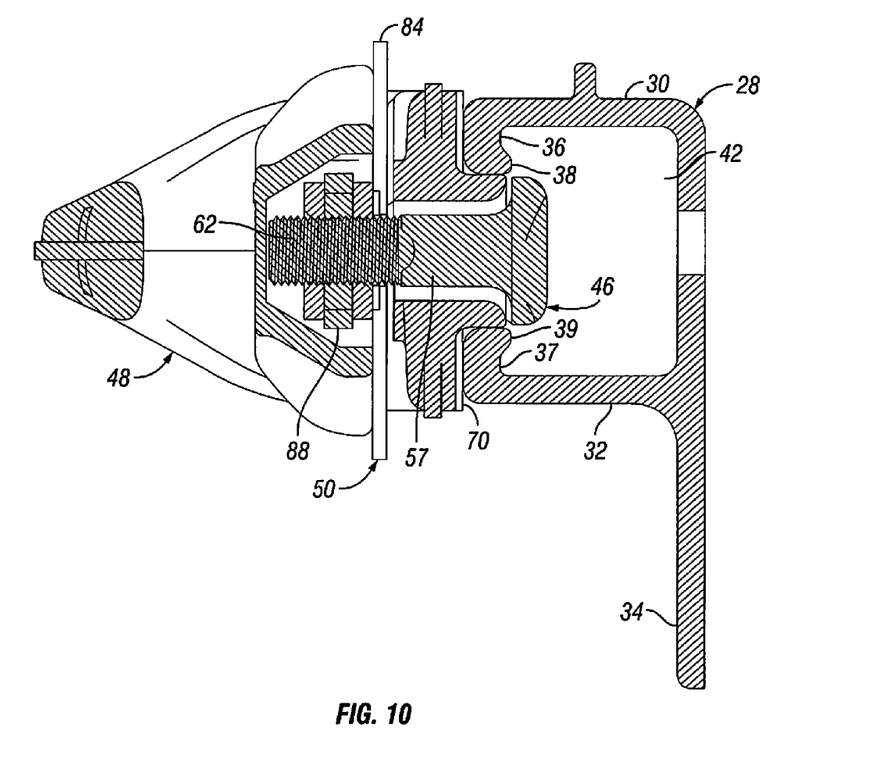
FIG. 10 is a rear elevation view in cross-section of the tie-down assembly received by the vehicle accessory track of FIG. 9.
Figure 14:
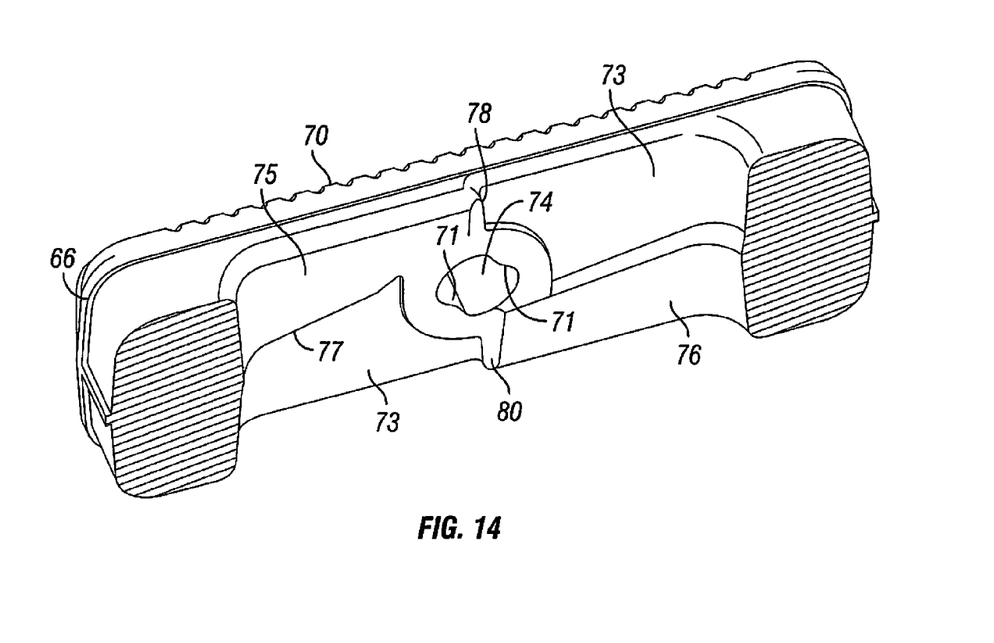
FIG. 14 is a perspective view in partial cross-section of the cleat of FIG. 12.

The base part 66 is preferably integrally formed with the outer part 64, but can alternatively be a separate element fixedly attached to the outer part 64. The base part 66 is configured to contact and clamp to the accessory track 28. As shown in FIGS. 6, 8 and 10, the base part 66 includes a clamping surface 70, a slot engagement member 72 and an aperture 74. The slot engagement member 72 extends along a length of the clamping surface 70 and extends outwardly therefrom. The width W3 of the slot engagement member 72 is preferably approximately equal to or slightly less that the width W1 of the slot 40 of the accessory track 28 such that the slot engagement member is receivable by the slot 40. The slot engagement member 72 is preferably centered on the clamping surface 70. As shown in FIGS. 6 and 14, the aperture 74 extends between the slot engagement member 72 and an upper surface 73 of the base part 66.

The indicator 52 includes at least one arm 84 extending outwardly from a body member 82, as shown in FIG. 6. An opening 86 is formed in the body member 84. The opening 86 is preferably centered in the body member 84. As shown in FIG. 6, the indicator 52 includes two indicator arms 84.

Figure 5:
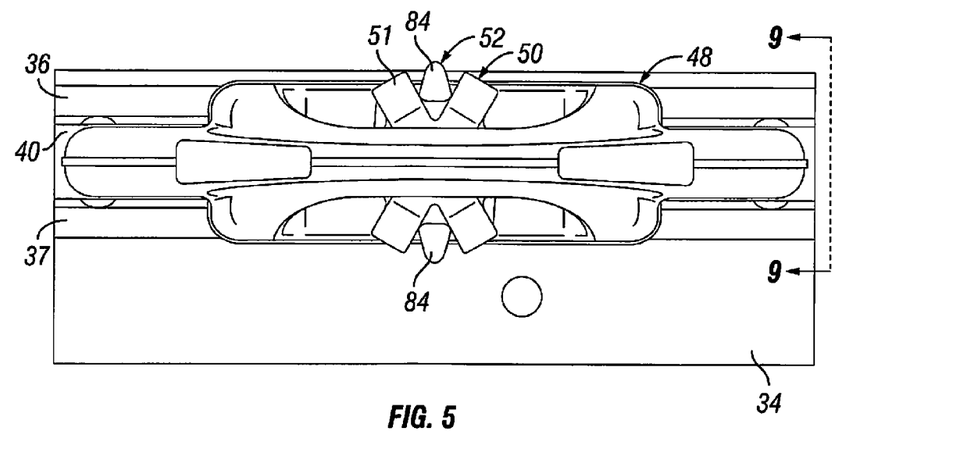
FIG. 5 is a side elevation view of the tie-down assembly of FIG. 3 in which an indicator is moved to a disengaged position.
Figure 11:
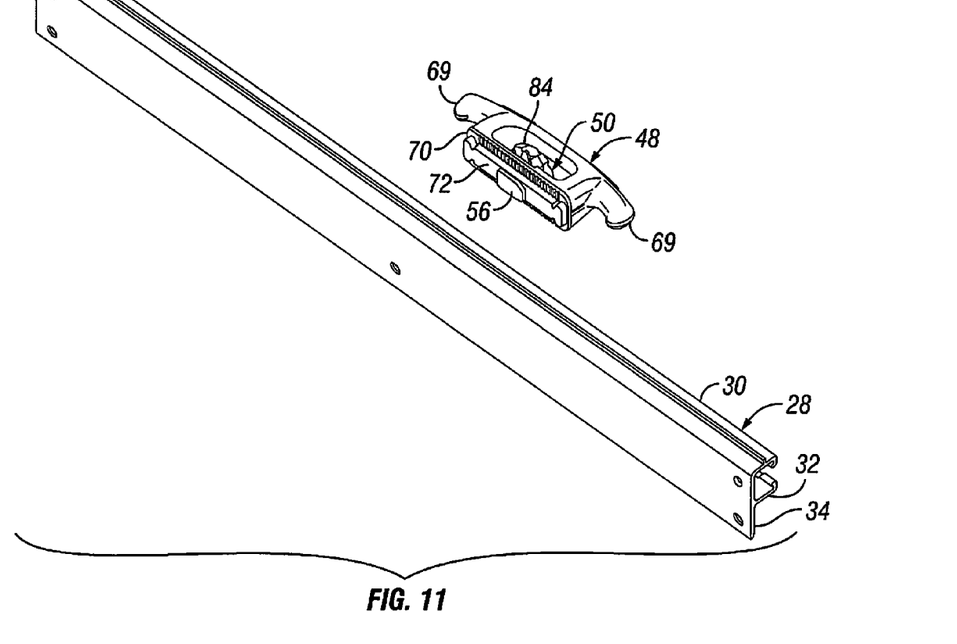
FIG. 11 is an outboard perspective view of the tie-down assembly removed from the vehicle accessory track.

The tightening member 50 is generally a substantially circular member with a plurality of radially extending gripping members 51, as shown in FIG. 6. The gripping members 51 are circumferentially spaced apart to facilitate gripping by a user. The tightening member 50 is disposed within the opening 68 of the outer part 64 of the cleat 48, as shown in FIGS. 5 and 11. As shown in FIG. 8, a recess 53 is formed in a lower surface 55 of the tightening member 50. The recess 53 is preferably centered on the lower surface 55 of the tightening member 50. A nut 88 is non-rotatably fixed in the recess 53 of the tightening member 50, as shown in FIGS. 8 and 10. The nut 88 is preferably centered in the recess 53 with respect to the lower surface 55.

Figure 9:
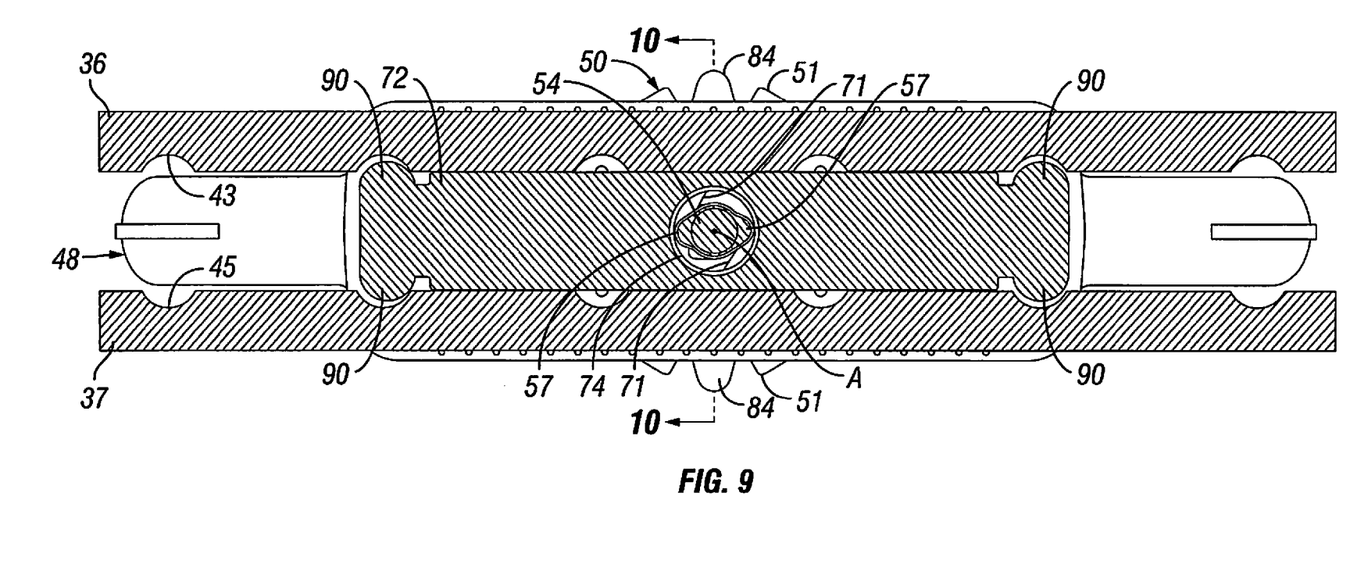
FIG. 9 is an inboard side elevation view in cross-section of the tie-down assembly received by the vehicle accessory track of FIG. 3 in which the indicator is moved to the disengaged position.

An assembled tie-down assembly 44 is shown in FIGS. 8 and 10. The nut 88 is fixedly retained in the tightening member 50. The tightening member 50 is disposed in the cleat opening 68, as shown in FIG. 5. The shaft portion 54 of the clamping member 46 is inserted through the cleat aperture 74 from the clamping surface 70. The threaded portion 62 extends into the cleat opening 68, and the non-threaded portion 60 is received within the cleat aperture 74. The indicator 52 is disposed on the shaft portion 54 of the clamping member 46, such that the indicator 52 is adjacent the upper surface 73 of the base part 66 of the cleat 48. The nut 88 receives the threaded portion 62 of the shaft portion 54 of the clamping member 46. As shown in FIGS. 8 and 10, the indicator 52 is received by the threaded portion 62 of the shaft portion 54 and is disposed between the upper surface 73 of the cleat 48 and the lower surface 55 of the tightening member 50. The arms 84 of the indicator 52 are preferably substantially perpendicular to a longitudinal axis A of the shaft portion 54, as shown in FIG. 9.

The threaded portion 62 of the shaft portion 54 of the clamping member 70 is threadedly engaged with the nut 88 of the tightening member 50. Rotation of the tightening member 50 causes movement of the clamping member 46 relative to the clamping surface 70 of the base part 66 of the cleat 48 of the tie-down assembly 44. To engage the tie-down assembly 44 with the accessory track 28, the tightening member 50 is rotated in a loosening direction to position the clamping portion 56 such that the clamping portion 56 is substantially parallel to the slot 40 of the accessory track 28. The width W2 of the clamping portion 56 is less than the width W1 of the slot 40 such that the clamping portion 56 can be inserted through the slot 40 into the interior 42 of the accessory track 28. The clamping portion 56 is obscured from view from the upper surface side of the cleat 48 when the clamping portion 56 is received within the accessory track 28. The width W3 of the engagement member 72 of the cleat 48 is less than the width W1 of the slot 40 such that the engagement member 72 can be inserted into the slot 40 of the accessory track 28. The threaded portion 62 of the shaft portion 54 preferably has a knurled end such that when the tightening member is loosened the nut 88 engages the knurled end and rotates the clamping portion 56 to an unlocked or disengaged position.

The threaded portion 62 of the shaft portion 54 has a flat surface 63 that extends longitudinally for substantially the length of the threaded portion 62, as shown in FIGS. 6 and 8. The indicator opening 85 has a corresponding flat edge 87 that engages the flat surface 63 of the threaded portion 62, thereby keying the indicator 52 to the shaft portion 54 of the clamping member 46. The keyed engagement between the indicator 52 and the shaft portion 54 allows the indicator 52 to rotate with the shaft portion 54 when the tightening member 50 rotates the clamping portion when engaging the knurled end of the shaft portion 54.

Figure 4:
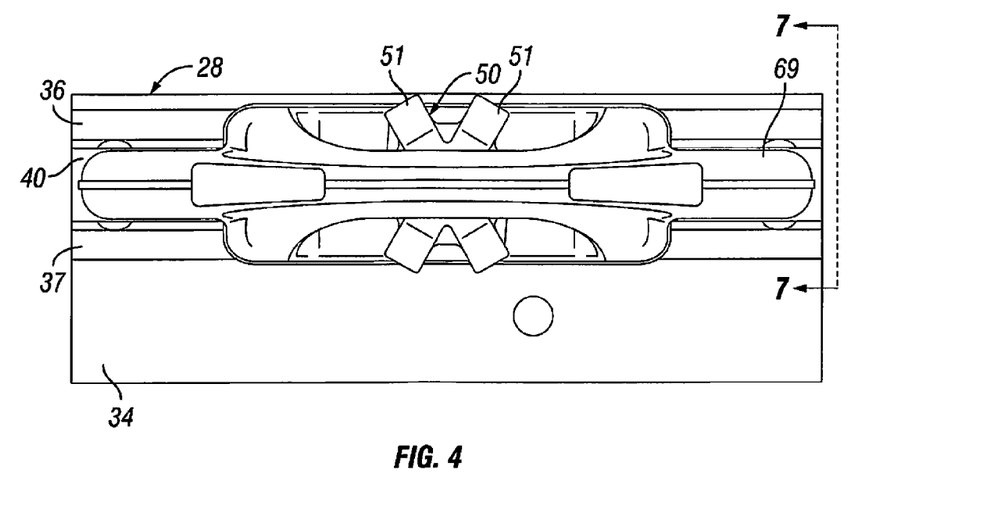
FIG. 4 is an inboard side elevation view of the tie-down assembly received by the vehicle accessory track of FIG. 3.

Thus, when the clamping member 46 is inserted through the slot 40 into the hollow interior 42 of the accessory track 28 as shown in FIGS. 6 and 8, rotation of the tightening member 50 in a tightening direction first rotates the clamping portion 56 of the clamping member approximately ninety degrees to the locked or engaged position, as shown in FIG. 8. The indicator 52 is keyed to the shaft portion 54 such that the indicator 52 rotates with the shaft portion 54. The indicator 52 is in the locked or engaged position, as shown in FIGS. 3 and 4. The indicator arms 84 do not extend or protrude beyond ends of the base portion 66 of the cleat 48, thereby indicating that the tie-down assembly is coupled to the accessory track 28. The length L1 of the clamping portion 56 is greater than the width W1 of the slot 40 such that the clamping member 46 is prevented from being removed through the slot 40. The tie-down assembly 44 can be slid along the length of the accessory track 28 to a desired position. As shown in FIG. 8, the accessory track projections 38 and 39 are received between clamping portion projections 58 and 59 to facilitate movement of the tie-down assembly 44 along the accessory track 28.

When the tie-down assembly 44 is in the desired position, the tightening member 50 is tightened to secure the tie-down assembly in the desired position. The lobes 57 of the shaft portion 54 are prevented from moving by the projections 71 in the cleat aperture 74. As shown in FIG. 7, rotation of the tightening member 50 to tighten the tie-down assembly 44 rotates the shaft portion 54 in the counter-clockwise direction. The lobes 57 engage the projection 71, thereby preventing rotation of the shaft portion 53. Continued rotation of the tightening member 50 reduces the distance between the base portion 66 of the cleat 48 and the clamping portion 56 of the clamping member 46, thereby clamping the upper and lower outer walls 36 and 37 between the clamping surface 70 of the cleat 48 and the clamping portion 56 of the clamping member 46. The ribbed surface of the clamping surface 70 (FIG. 11) facilitates clamping the accessory track 28 and substantially prevents movement of the clamped tie-down assembly 44 relative to the accessory track 28.

Opposite ends of the engagement member 72 can include periphery portions 90 formed in a shape conforming to that of the recesses 43 and 45 in the upper and lower outer walls 36 and 37, as shown in FIGS. 7 and 9, to facilitate engagement therebetween. When securing the tie-down assembly 44 in the desired position, the periphery portions 90 of the engagement member 72 are received by the accessory track recesses 43 and 45. The plurality of recesses 43 and 45 provide a plurality of predetermined positions in which the tie-down assembly 44 can be secured to the accessory track 28.

To disengage the tie-down assembly 44 from the accessory track 28, the tightening member 50 is rotated in the direction opposite to the tightening direction. The distance between the base portion 66 of the cleat 48 and the clamping portion 56 of the clamping member 46 is increased, thereby allowing the tie-down assembly to be moved along the accessory track 28. Further rotation of the tightening member 50 causes the nut 88 to engage the knurled end of the threaded portion 62 of the shaft portion 54, thereby rotating the shaft portion 54. The shaft portion 54 is rotated until the lobes 57 engage the projections 71, which is approximately ninety degrees, as shown in FIG. 9. The indicator 52 is keyed to the shaft portion 54, thereby rotating the indicator 52 with the shaft portion 54. The arms 52 of the indicator are moved to an unlocked or disengaged position, as shown in FIGS. 5 and 9, in which the arms 52 extend beyond opposite sides of the base portion 55 of the cleat 48. The arms 84 are preferably substantially perpendicular to the axis of the slot 40 when the indicator 52 is in the unlocked position. As shown in FIGS. 5 and 9, the arms 84 are clearly visible to a user to indicate the unlocked position of the clamping member 46. The clamping portion 56 is in a position such that the length L1 is generally parallel to the slot 40. The width W2 of the clamping portion 56 is less than the width W1 of the slot 40 such that the tie-down assembly 28 can be removed from the accessory track 28, as shown in FIG. 11. The tie-down assembly 44 can be removed from any portion of the accessory track 28 and does not need to be slid out an end of the track for removal. A distal end of the arms 84 of the indicator 52 can include indicia to indicate that the clamping member 46 is in the unlocked position.

Figure 12:
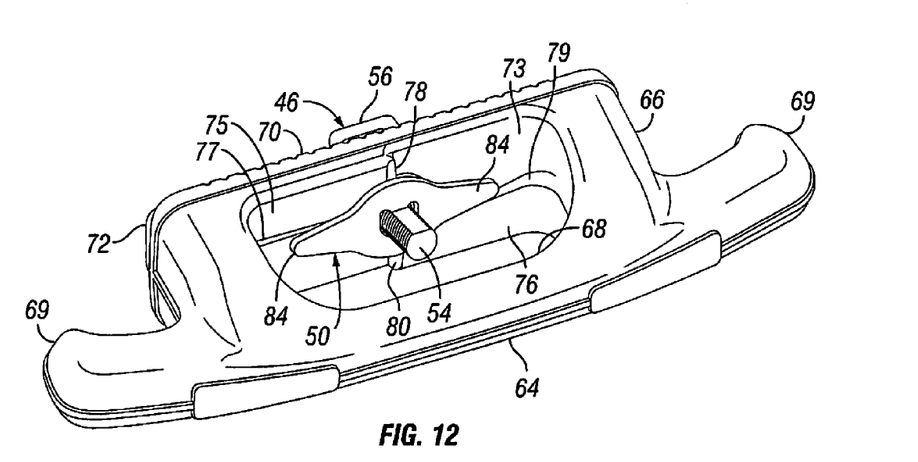
FIG. 12 is a perspective view of the tie-down assembly including a cleat in accordance with another exemplary embodiment of the present invention in which the indicator is in an engaged position.
Figure 13:
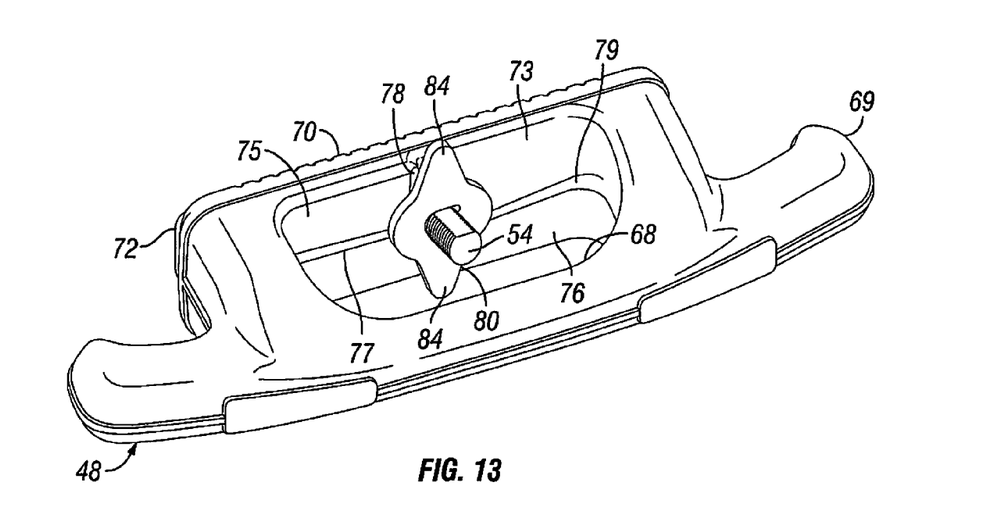
FIG. 13 is a perspective view of the tie-down assembly of FIG. 12 in which the indicator is moved to a disengaged position.

In another exemplary embodiment of the present invention shown in FIGS. 12-14, first and second projections 75 and 76 extend outwardly from the upper surface 73 of the base part 66. The first projection 75 has first and second stopping surfaces 77 and 78. The second projection 76 has first and second stopping surfaces 79 and 80. The indicator 52 is shown in the unlocked position in FIG. 12. The indicator arms 84 contact the stopping surfaces 77 and 79 of the first and second projections 75 and 76, thereby preventing further rotation of the shaft portion 54 of the clamping member 46.

As shown in FIG. 13, the clamping member 46 has been moved to the unlocked position. The indicator arms 84 engage the stopping surfaces 78 and 80 of the first and second projections 75 and 76, thereby preventing further rotation of the shaft portion 54 when tightening the tightening member 50. As shown in FIGS. 12 and 13, each indicator arm 84 contacts a stopping surface of one projection in one position and engages a stopping surface of the other projection in the other position. For example, the indicator arm 84 engaging the stopping surface 77 of the first projection 75 in the unlocked position in FIG. 12, engages the stopping surface 80 of the second projection 76 in the locked position in FIG. 13. The stopping surfaces can be utilized in addition to, or in lieu of, the aperture projections 71 to control movement of the indicator 52.

Figure 15:
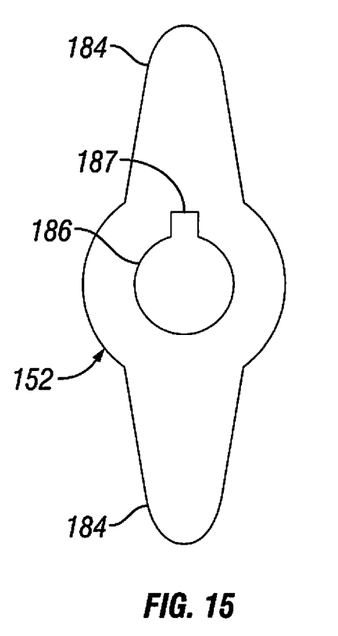
FIG. 15 is an elevation view of an indicator in accordance with another exemplary embodiment of the present invention.
Figure 16:
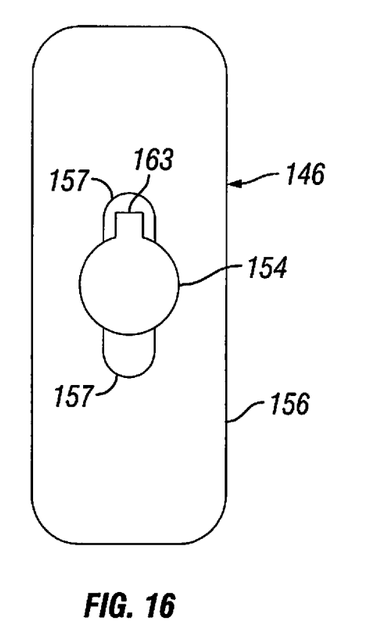
FIG. 16 is an elevation view of a clamping member engageable with the indicator of FIG. 15.

In another exemplary embodiment of the present invention shown in FIGS. 15 and 16, an indicator 152 and clamping member 146 are substantially similar to the indicator 52 and clamping member 46 described above with the following exceptions.

The indicator 152 includes a notch 187 extending outwardly from the opening 186, as shown in FIG. 15. The clamping member 146 has a corresponding projection 163 extending outwardly from the shaft portion 154, as shown in FIG. 16. The projection 163 is disposed above the lobes 157 of the shaft portion 154, which extend outwardly from the clamping portion 156 of the clamping member 146. The indicator notch 187 and the clamping member projection 163 have corresponding shapes to facilitate alignment therebetween. Any suitable configuration can be used that allows the indicator 152 to rotate with the shaft portion 154 of the clamping member 146 such that the indicator arms 184 indicate the locked or unlocked position of the clamping member 146 of the tie-down assembly 12.

Figure 17:
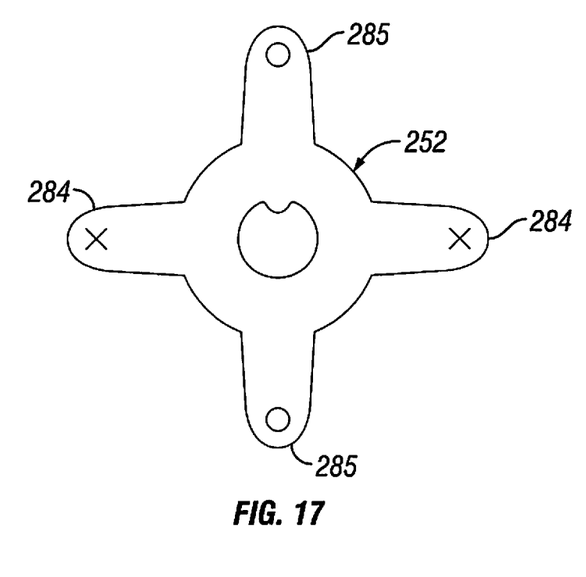
FIG. 17 is an elevation view of an indicator in accordance with another exemplary embodiment of the present invention.

In another exemplary embodiment of the present invention shown in FIG. 17, the indicator 252 has four outwardly extending arms 284 and 285. A first pair of diametrically opposed arms 284 has first indicia at a distal end thereof to indicate the clamping member of the tie-down assembly 12 being in the locked position. A second pair of diametrically opposed arms 285 has second indicia at a distal end thereof to indicate the clamping member of the tie-down assembly 12 being in the unlocked position. The first indicia can be the letter "O" to indicate the locked position, and the second indicia can be the letter "X" to indicate the unlocked position. Any suitable indicia can be used to indicate the locked and unlocked positions, such as text or color. For example, the first pair of arms 284 are a first color, such as red, to indicate the unlocked position, and the second pair of arms 285 are a second color, such as green, to indicate the locked position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the embodiments according to the present invention are provided for illustration only, and not for the purpose of limiting the invention as defined by the appended claims and their equivalents.

What is claimed is:
1. A tie-down assembly, comprising:
   a clamping member configured to engage an accessory track of a vehicle and including a shaft, the clamping member being movable between an engaged position securing the tie-down assembly to the accessory track and a disengaged position such that the tie-down assembly is removable from the accessory track;
   a cleat movably receiving the clamping member and having a first side configured to engage the accessory track, the shaft of the clamping member passing through the cleat;
   a tightening member movably receiving a free end of the shaft of the clamping member, the tightening member engaging the shaft on a second side of the cleat opposite the first side of the cleat; and
   an indicator fixed to the clamping member, the indicator being movable with the clamping member between a locked position in which the clamping member is in the engaged position and an unlocked position in which the clamping member is in the disengaged position, the indicator indicating the locked and unlocked positions when viewed from the second side of the cleat.
2. The tie-down assembly according to claim 1, wherein the shaft of the clamping member has a non-threaded portion and a threaded portion, and
   the threaded portion of the shaft is received by the tightening member and the non-threaded portion is received by the cleat.
3. The tie-down assembly according to claim 1, wherein the indicator includes at least one outwardly extending arm.
4. The tie-down assembly according to claim 3, wherein the indicator includes a pair of diametrically opposed arms protruding from opposite sides of the cleat when the indicator is in the unlocked position to indicate the disengaged position of the clamping member.

5. The tie-down assembly according to claim 3, wherein the at least one outwardly extending arm is visible when the indicator is in the unlocked position to indicate the disengaged position of the clamping member.

6. The tie-down assembly according to claim 3, wherein a distal end of the at least one outwardly extending arm includes indicia to indicate the indicator being in the unlocked position and that the clamping member is in the disengaged position such that the tie-down assembly is removable from the accessory track.

7. The tie-down assembly according to claim 3, wherein the indicator has two pairs of outwardly extending arms, a first pair protruding from opposite sides of the cleat to indicate the locked position of the clamping member and a second pair protruding from opposite sides of the cleat to indicate the unlocked position of the clamping member.

8. The tie-down assembly according to claim 7, wherein the first pair of outwardly extending arms are a first color and the second pair of outwardly extending arms are a second color different from the first color.

9. The tie-down assembly according to claim 1, wherein an inner peripheral edge of the cleat defines an aperture that receives the shaft of the clamping member, the inner peripheral edge including projections that limit rotation of the shaft to approximately ninety degrees.

10. The tie-down assembly according to claim 1, wherein the second side of the cleat has a ridge to limit rotation of the indicator to approximately ninety degrees.

11. The tie-down assembly according to claim 3, wherein the at least one outwardly extending arm is substantially perpendicular to a longitudinal axis of the shaft of the clamping member.

12. A vehicle track system, comprising:
a body structure;
an accessory track formed therein; and
a tie-down assembly engageable with the accessory track, the tie-down assembly including
a clamping member configured to engage the accessory track and including a shaft, the clamping member being movable between an engaged position securing the tie-down assembly to the accessory track and a disengaged position such that the tie-down assembly is removable from the accessory track;
a cleat movably receiving the clamping member and having a first side configured to engage the accessory track, the shaft of the clamping member passing through the cleat;
a tightening member movably receiving a free end of the shaft of the clamping member, the tightening member engaging the shaft on a second side of the cleat opposite the first side of the cleat; and
an indicator fixed to the clamping member, the indicator being movable with the clamping member such that the indicator extends beyond an outer peripheral edge of the cleat when the clamping member is in the disengaged position.

13. The vehicle track system according to claim 12, wherein
the shaft of the clamping member extends outwardly from a base member, the base member being obscured from view from the second side of the cleat when the clamping member is received within the accessory track.

14. The vehicle track system according to claim 12, wherein
the indicator includes a pair of diametrically opposed arms protruding from opposite sides of the cleat to indicate the clamping member being in the disengaged position.

15. The vehicle track system according to claim 12, wherein
the indicator includes at least on outwardly extending arm, and
a distal end of the at least one outwardly extending arm includes indicia to indicate the clamping member is in the disengaged position such that the tie-down assembly is removable from the accessory track.

16. The vehicle track system according to claim 12, wherein
the indicator has two pairs of outwardly extending arms, a first pair protruding from opposite sides of the cleat to indicate the engaged position of the clamping member and a second pair protruding from opposite sides of the cleat to indicate the disengaged position of the clamping member.

17. The vehicle track system according to claim 16, wherein
the first pair of arms has first indicia visible to indicate the engaged position of the clamping member and the second pair of arms has second indicia to indicate the disengaged position of the clamping member.

18. The vehicle track system according to claim 12, wherein
an inner peripheral edge of the cleat defines an aperture that receives the shaft of the clamping member, the inner peripheral edge including projections that limit rotation of the shaft to approximately ninety degrees.

19. The vehicle track system according to claim 12, wherein
the second side of the cleat has a ridge to limit rotation of the indicator to approximately ninety degrees.

20. The vehicle track system according to claim 12, wherein
the at least one outwardly extending arm is substantially perpendicular to a longitudinal axis of the shaft of the clamping member.

* * * * *